(12) United States Patent
Ramsay et al.

(10) Patent No.: US 7,600,615 B2
(45) Date of Patent: Oct. 13, 2009

(54) FINNED BRAKE DUCT TO DIVERT COOLING AIR TO A VEHICLE BRAKE SYSTEM

(75) Inventors: Thomas Ramsay, Worthington, OH (US); Christos Agouridis, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 226 days.

(21) Appl. No.: 11/193,700

(22) Filed: Jul. 29, 2005

(65) Prior Publication Data

US 2007/0023238 A1 Feb. 1, 2007

(51) Int. Cl.
*F16D 65/12* (2006.01)
(52) U.S. Cl. .................. 188/264 AA; 188/71.6
(58) Field of Classification Search ............. 188/264 R, 188/264 A, 264 AA, 264 W, 71.6, 218, 218 XL; 301/6.3, 6.4; 296/180.1, 208
See application file for complete search history.

(56) References Cited

U.S. PATENT DOCUMENTS

| | | | |
|---|---|---|---|
| 4,772,299 A | | 9/1988 | Bogusz |
| 4,805,747 A | | 2/1989 | Moedinger et al. |
| 4,810,021 A | * | 3/1989 | Burst ..................... 296/180.1 |
| 5,121,818 A | | 6/1992 | McComic |
| D328,063 S | * | 7/1992 | Yunes ..................... D12/181 |
| 5,513,893 A | | 5/1996 | Nakata et al. |
| 5,820,203 A | | 10/1998 | Morelli et al. |
| 6,315,091 B1 | | 11/2001 | Nilsen et al. |

FOREIGN PATENT DOCUMENTS

| | | | |
|---|---|---|---|
| DE | 3711682 A1 | * | 9/1988 |
| DE | 3910020 A | * | 10/1990 |
| GB | 2353013 A | * | 2/2001 |
| JP | 2005178427 A | * | 7/2005 |
| KR | 2005036058 A | * | 4/2005 |

* cited by examiner

*Primary Examiner*—Xuan Lan Nguyen
(74) *Attorney, Agent, or Firm*—Rankin, Hill & Clark LLP; Mark E. Duell

(57) ABSTRACT

A brake duct assembly for use in communicating cooling air from a front facia of a vehicle to a front brake assembly. The assembly includes an inlet portion, a passageway portion, and an outlet portion. The portion is disposed in the vehicle facia, and the outlet portion extends through an opening in a wheel well liner surrounding the front brake assembly. The passageway portion extends between and interconnects the inlet portion and the outlet portion. The outlet portion is spaced a distance from the front brake assembly and includes a plurality of fins that serve to transform the air stream received from the passageway portion into a plurality of air streams that are directed toward the front brake assembly and serve to cool said front brake assembly. The brake duct assembly is adapted for installation in reduced-space locations and for providing cooling air from the outlet portion that is spaced remotely from the brake assembly.

26 Claims, 4 Drawing Sheets

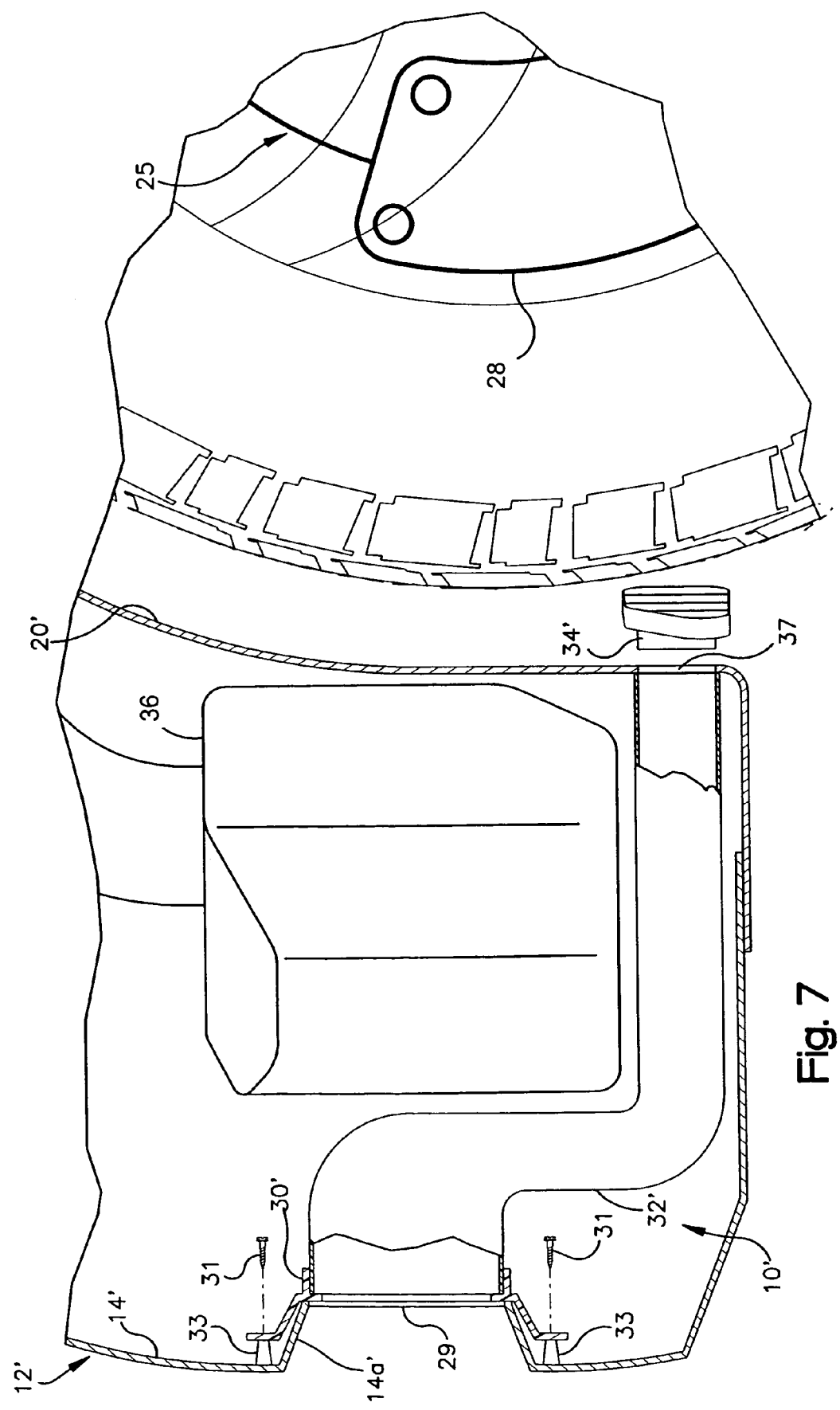

FINNED BRAKE DUCT TO DIVERT COOLING AIR TO A VEHICLE BRAKE SYSTEM

BACKGROUND OF THE INVENTION

1. Field of the Invention

The present invention is generally directed toward vehicle brake assemblies and, more specifically, toward structures for directing cooling air to such vehicle brake assemblies.

2. Description of the Related Art

As more vehicles have employed front facia extending below the front bumper and other structures that reduce air flow to the vehicle's interior heat-generating components, it has been more common to provide ducts or other passageways to communicate cooling air to the heat generating components. If such components are in the engine compartment, this is a rather simple matter because numerous paths for air communication are available. However, for heat generating components that are disposed external to the engine compartment, providing sufficient targeted cooling air is problematic. These problems are the result of the severe space limitations for a cooling air duct, as well as by the swirling airflow inherent in a location external to the engine compartment or other confined space.

In this regard, in order to solve problems associated with insufficient cooling resulting from reduced air flow to the front brake assemblies, it has been known in the art to provide ducts or other structures to communicate cooling air from a forward area of the vehicle to the front brake assembly. For example, it is known to provide an opening in the front facia through which cooling air may flow toward the front brake assembly. Conventionally, the opening in the front facia simply defines a passageway through which air flows, and the air flowing therethrough is not directed or oriented in any way. It has also been proposed to provide a duct that extends from the front facia to the front brake assembly, and serves to communicate air directly from the front facia to the front brake assembly. Such known structures typically include straight pipes that have an outlet attached directly to the brake assembly and, as such, are difficult to install and complicate the vehicle assembly process as they must be installed after the brake assembly is in place.

Therefore, there exists a need in the art for a structure that will reliably direct a stream of cooling air to the vehicle's front brake assemblies. Further, there exists a need in the art for such a structure that may be easily installed and that does not complicate the vehicle assembly process.

SUMMARY OF THE INVENTION

The present invention is directed toward an assembly that reliably directs a stream of cooling air to the front brake assembly of a motor vehicle. The present invention is further directed toward an assembly that accommodates changes in vehicle design, and that is adapted for implementation in limited-space installations. Finally, assembly of the present invention permits simplified manufacture and installation, including assembly independent of the front brake assembly.

In accordance with the present invention, the assembly includes an inlet portion, a passageway portion, and an outlet portion. The passageway portion is curved or bent so as to extend around or otherwise accommodate placement of other vehicle components, to extend through a reduced space, and so as to communicate cooling air from the inlet portion to the outlet portion. The inlet portion is disposed in an opening in a front facia of the vehicle, and is disposed relatively high on the face of the front facia. The outlet portion is disposed in an opening in a wheel well liner surrounding a front wheel of the vehicle. Preferably, the wheel well liner opening is disposed inboard relative to the associated front wheel and the front brake assembly, and is adapted to direct the cooling air stream rearwardly and outwardly toward the associated front brake assembly.

In further accordance with the present invention, the outlet portion is designed to reliably deliver a flow of cooling air to the associated front brake assembly despite being spaced a distance from the brake assembly. More particularly, the outlet portion includes a series of air directing fins or louvers that serve to redirect the air flow from the outlet end of the passageway portion so as to send the cooling air to the brake assembly.

In further accordance with the present invention, the face of the outlet portion includes an inner edge that is disposed inwardly relative to the vehicle centerline and an outer edge that is disposed outwardly relative to the vehicle centerline. Preferably, the inner edge extends rearwardly relatively farther than the outer edge such that an outlet face of the outlet portion is angled away from the vehicle centerline and toward the associated front brake assembly. The fins are disposed generally perpendicular to the outlet face so as to direct multiple cooling air flows toward the associated front brake assembly.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
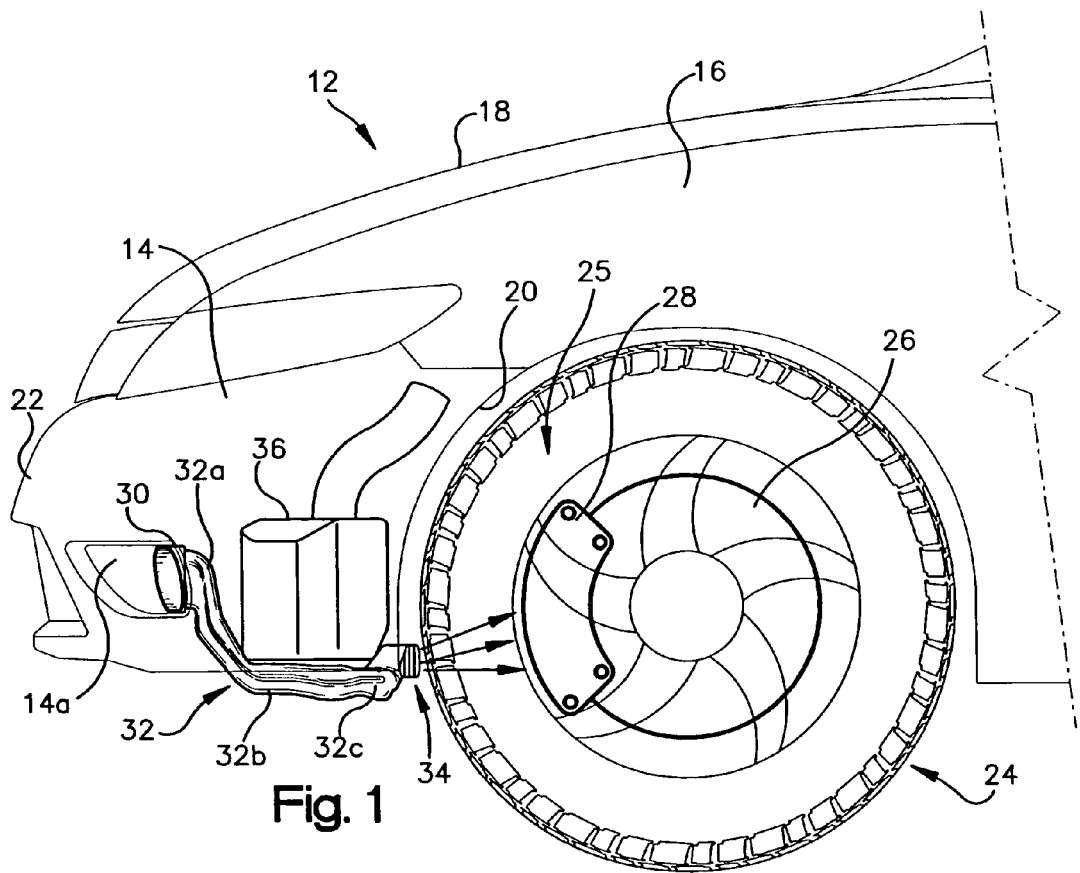
FIG. 1 is a side elevational view of a vehicle and schematically illustrating placement of a brake duct according to the present invention.
Figure 2:
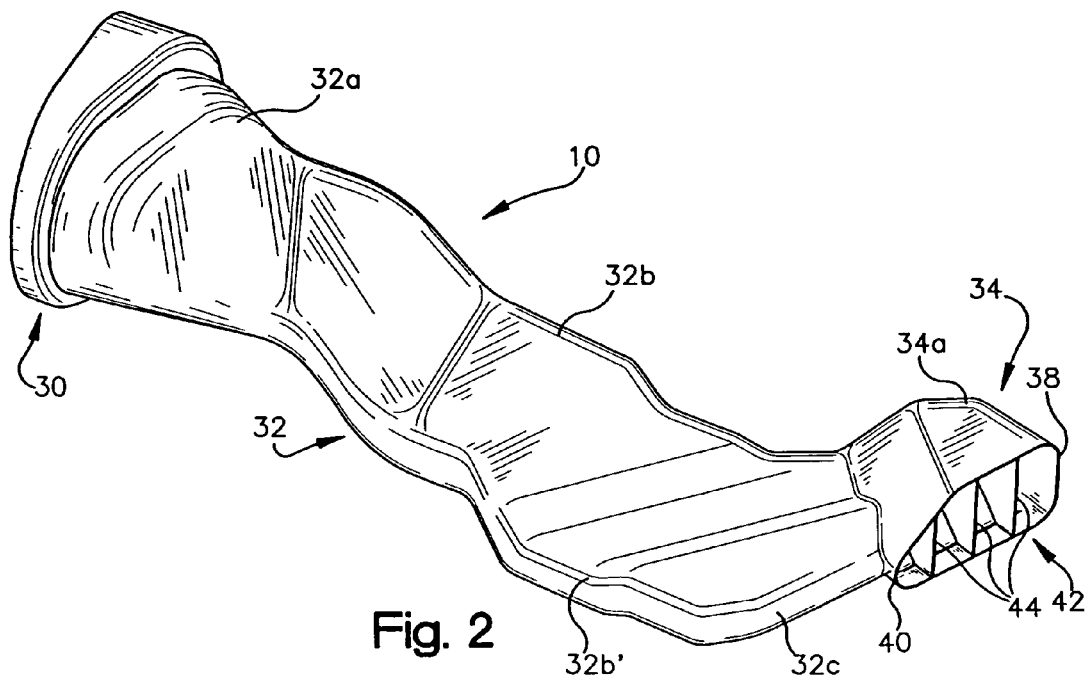
FIG. 2 is a perspective view of the finned brake duct according to the present invention.

With reference to FIGS. 1 and 2, a finned brake duct assembly 10 according to the present invention is illustrated. In FIG. 1 the brake duct assembly 10 is shown disposed within a representative vehicle 12, which includes a front facia 14, a front fender 16, a hood 18, and a wheel well liner 20. The front facia 14, which may be molded from a plastic material, preferably includes a front bumper 22 and serves to provide a clean, aesthetically pleasing appearance to the lower front end and lower front corners of vehicle 12. A front wheel assembly 24, including a front wheel and a front disc brake assembly 25 is disposed within the wheel well so as to be surrounded by the wheel well liner 20. The disc brake assembly 25 conventionally includes a rotor 26 and calipers 28, as is well known in the art.

The brake duct assembly 10 includes an inlet portion 30, a passageway portion 32, and an outlet portion 34, and extends between the front facia 14 of the vehicle 12 and the wheel well liner 20. More specifically, the facia 14 includes a recessed portion 14a having an opening formed therein in which the brake duct inlet portion 30 is disposed. Preferably, the recessed portion 14a is disposed at or near a corner of the facia 14 and the opening is forwardly facing such that the brake duct inlet portion 30 is disposed to receive ram air as the vehicle 12 moves forwardly. The inlet portion 30 may integrally include a screen (not shown) or other means to prevent unwanted road debris from entering the brake duct assembly 10.

In the illustrated and preferred embodiment, the passageway portion 32 of the brake duct assembly 10 extends integrally between the inlet portion 30 and the outlet portion 34 so as to form a unitary or one piece brake duct. Naturally, and as described hereinafter, it is contemplated that the passageway portion 32 could be formed separately from the inlet and outlet portions 30, 34 and attached thereto by conventional mechanical devices, such as bayonet-type fasteners, screws, or a combination of such mechanical fasteners. Further, the illustrated and preferred embodiment of the passageway portion 32 is generally adapted to accommodate desired placement of other components within the vehicle 10, such as an intake air resonator 36 schematically illustrated in FIG. 1, and therefore should be considered as a non-limitative example of the inventive brake duct assembly 10, with it being apparent that one skilled in the art, using the teachings of the present invention, will be able-to construct equivalent embodiments of the present invention that are adapted for use in vehicles having different structural components disposed between the inlet and outlet portions 30, 34 and, therefore, differently shaped passageway portions 32. Further, the passageway portion 32 may, if desired, include mounting ears (not shown) to facilitate attachment to structural supports provided by the vehicle 10 so as to stably mount the brake duct assembly 10 thereto.

The passageway portion 32 includes an upstream portion 32a, a body portion 32b, and a downstream portion 32c. The upstream portion 32a is disposed integrally adjacent the inlet portion 30, receives an incoming air stream from the inlet portion 30, and converts the incoming air stream into an air stream that flows rearwardly, but vertically offset (below) the inlet portion 30. The upstream portion 32a is generally cylindrical or oval in cross-section in a position adjacent the inlet portion 30 and gradually converges into a generally flattened rectangular cross-section as it extends toward the passageway body portion 32b.

The body portion 32b extends rearwardly from the upstream portion 32a and fluidly connects the upstream and downstream portions 32a, 32c. The body portion 32b defines a generally planar passage in that the air stream introduced therein from the upstream portion 32a does not significantly change elevation while flowing through the body portion 32b. However, the body portion 32b is widened and flattened laterally as compared to the relatively cylindrical inlet portion 30 and the initial or input end of the upstream portion 32a, and thereby defines a generally rectangular cross sectional shape. Widening the body portion 32b while reducing its vertical height helps to maintain the cross-sectional area required for sufficient flow of cooling air, while providing a reduced profile for the brake duct passageway portion 32 such that the brake duct passageway portion 32 does not extend an undesirable amount below the facia 14, as illustrated, with it being kept in mind that lower flexible garnishes (not shown) may be applied to extend downwardly from the lower peripheral edge of the facia 14, if desired.

Figure 3:
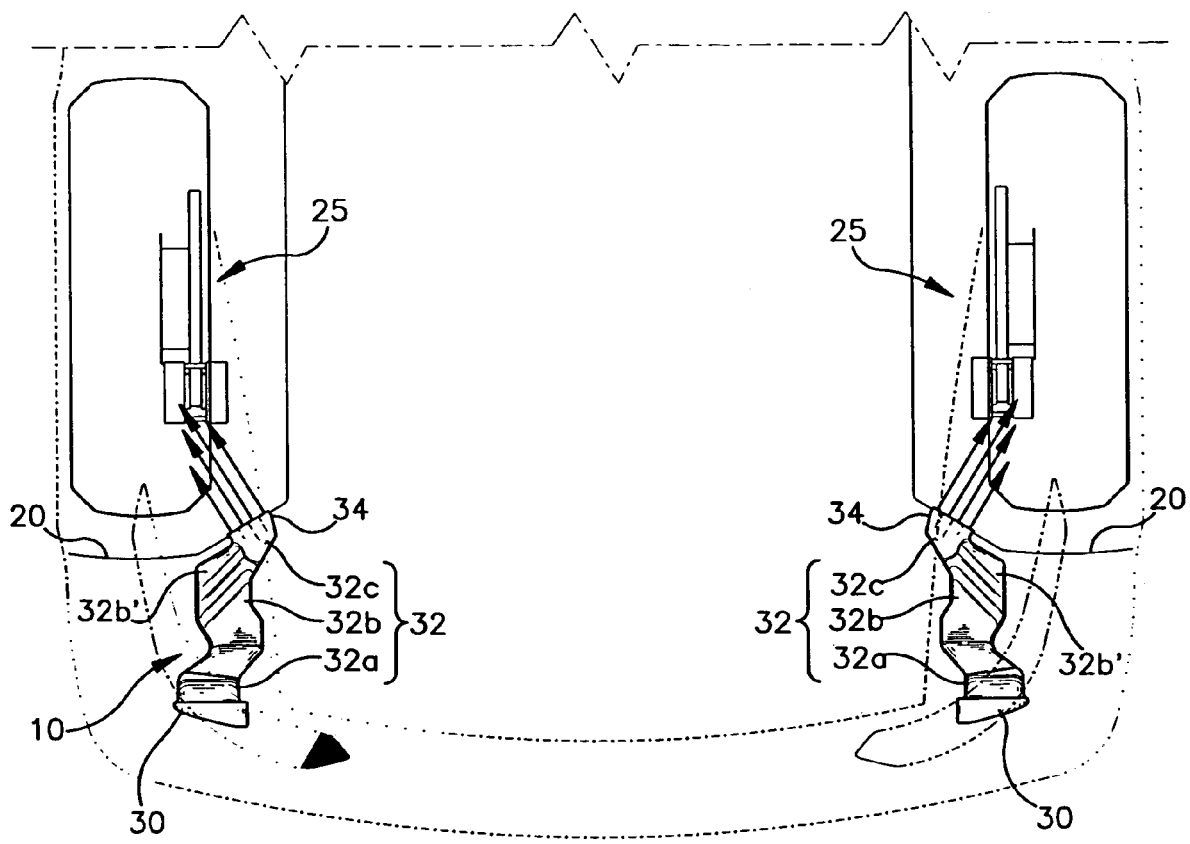
FIG. 3 is a schematic top plan view illustrating cooling air flow provided by the brake ducts according to the present invention.

With reference to FIGS. 2-3, it is shown that the body portion 32b of the passageway portion 32 includes an angled or offset section 32b' adjacent the downstream portion 32c. The angled or offset section 32b' is provided to accommodate vehicle structural components while permitting sufficient cooling flow through the passageway portion 32, and may be considered optional in other installations.

The downstream portion 32c extends rearwardly and laterally inwardly from the passageway body portion 32b and provides a reduced cross-sectional area as compared to the passageway body portion 32b. As such, the downstream portion 32c helps to transform the generally rearwardly flowing, low pressure cooling air stream into a laterally inwardly and rearwardly directed, high pressure cooling air stream. The passageway downstream portion 32c merges with the outlet portion 34 of the brake duct assembly 10 and thereby delivers the laterally inwardly and rearwardly directed high pressure cooling air stream to the outlet portion 34.

The outlet portion 34 provides a relatively enlarged body 34a including an inward edge 38, and outward edge 40, an outlet face 42, and integrally including a plurality of fixed fins or louvers 44. Preferably, the outlet portion 34 extends through an opening in the wheel well liner 20, with the wheel well liner opening being disposed laterally inboard relative to the brake assembly 25. Although it is not mandatory, due to the swirling air currents experienced in the wheel well and the vertical position of the front brake assembly 25, the wheel well liner opening is preferably disposed at a bottom edge or adjacent a bottom edge of the wheel well liner 20, as illustrated.

Figure 4:
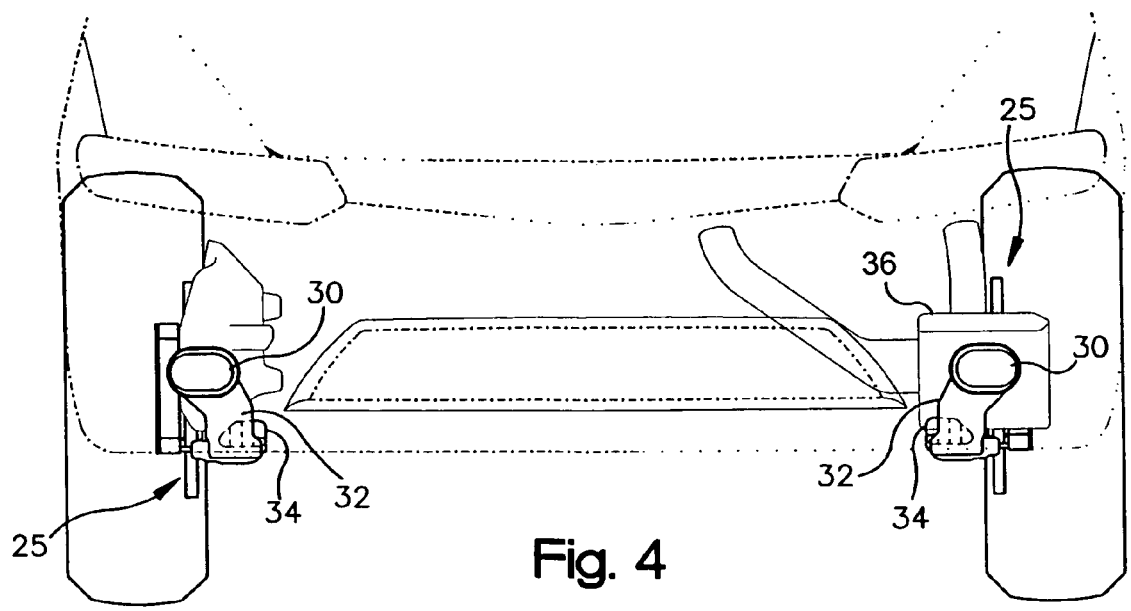
FIG. 4 is a front plan view of the arrangement of FIG. 3.

The outlet portion body 34a defines a cavity that receives the laterally inwardly and rearwardly directed high pressure cooling stream from the passageway downstream portion 32c. The cooling air stream expands in the body cavity, while being redirected by cooperation of the body 34 and the fins 44 into an upwardly and laterally outwardly expanding cooling air stream that is directed through the outlet face 42 toward and over the associated brake assembly 25, as shown best in FIGS. 2-3. As will be appreciated, the output air stream, directed by the fins 44, permits the brake duct outlet face 42 to be disposed adjacent the wheel well liner 20 and spaced remotely a distance from the brake assembly 25, which would otherwise not be possible. As such, assembly of the duct assembly 10 is simplified, and the risk of damage to the duct assembly during operation of the vehicle is reduced. The outlet face 42 is disposed relatively vertically below the inlet portion 30, and relatively laterally inboard of the inlet portion 30, as shown best in FIGS. 3 and 4.

Figure 5:
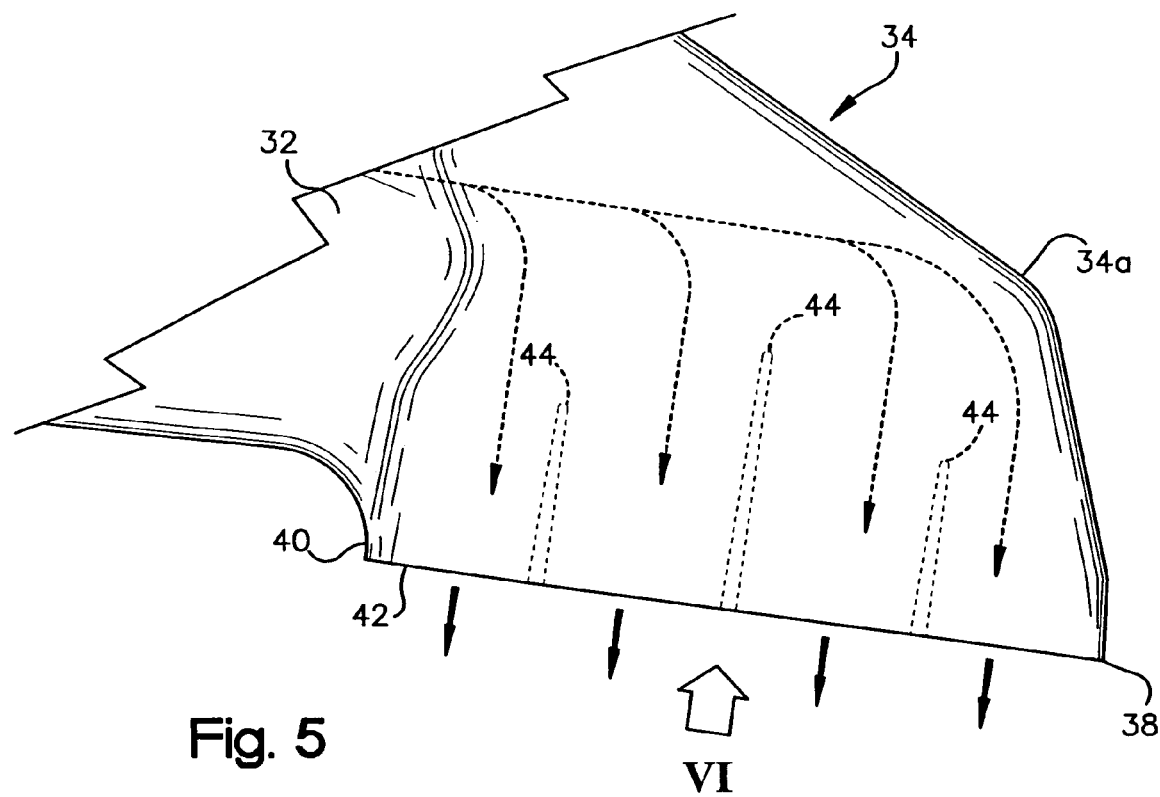
FIG. 5 is an enlarged top plan view of the outlet portion of the brake duct according to the present invention.
Figure 6:
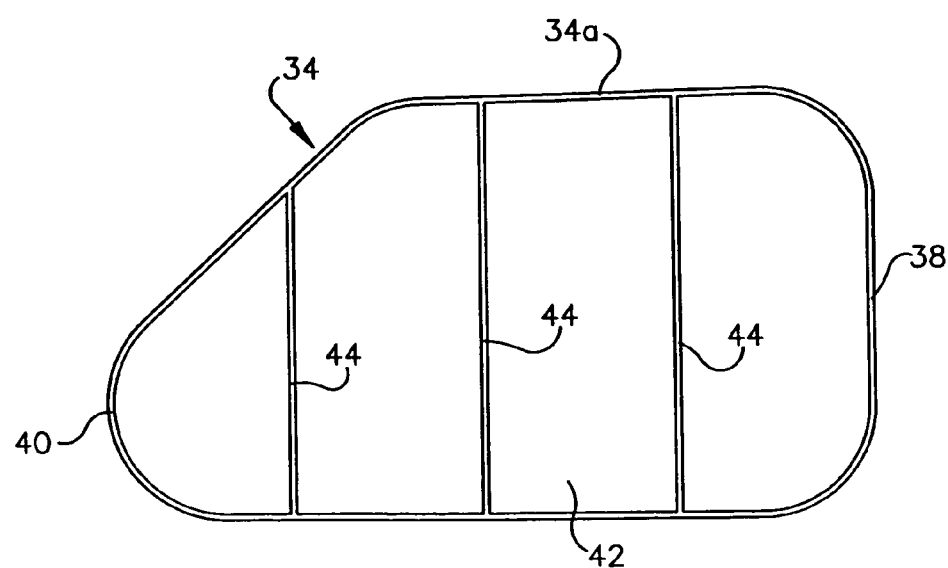
FIG. 6 is an end elevational view of the brake duct outlet portion as seen in the direction of arrow VI in FIG. 5; and, FIG. 7 schematically illustrates a second embodiment of the present invention.

The outlet face 42 has a relatively reduced opening area at an outboard end, which is defined by the outward edge 40, and a relatively enlarged opening area at an inboard end, which is defined by the inward edge 38. The inward edge 38 is disposed closer to the vehicle centerline and relatively rearwardly as compared to the outward edge 40, such that the outlet face 42 is angled rearwardly and outwardly relative to the length direction of the vehicle 12, as illustrated best in FIGS. 1, 3, and 5. Angling the outlet face 42 in this manner directs the vertically expanding cooling air stream rearwardly and laterally outwardly toward the associated brake assembly 25, and is believed to help counteract or overcome the effects of the swirling air currents within the wheel well.

The fins 44 disposed within the outlet portion 34 also assist in directing the cooling air flow toward the associated brake assembly 25. More specifically, the fins preferably include three fins 44 that cooperate with the outlet portion body 34a to separate the outgoing cooling air flow into four separate streams. It will be appreciated that the body cavity may be viewed as a manifold that communicates cooling air to the separate, relatively higher pressure cooling air streams exiting at the outlet face 42. The fins 44 extend generally perpendicular to the outlet face 42 and forwardly into the outlet portion body 34a from the outlet face 42, and integrally extend between upper and lower edges of the body 34a. As such, the fins 44 are set at an angle to the vehicle length direction. The fins have a length sufficient to convert the rearwardly and laterally inwardly cooling air stream introduced into the outlet portion 34 into a rearwardly and laterally outwardly directed, vertically expanding cooling air stream that exits the outlet face 42 and is directed substantially toward the associated front brake assembly 25.

In alternative constructions, the fins 44 may be set at a non-ninety degree angle to the outlet face 42 in order to obtain desired flow characteristics. Moreover, the individual fins 44 may not be parallel to one another in order to properly direct the cooling flow to the associated brake assembly 25. The length of the individual fins 44 is tuned to the desired flow characteristics and, as such, the illustrated lengths are considered to be exemplary rather than limitative.

With reference to FIG. 7, an alternative embodiment of the brake duct assembly 10' is schematically illustrated. In this alternative embodiment, the brake duct inlet portion 30', passageway portion 32', and outlet portion 34' are formed as separate pieces, rather than as the integral or one-piece structure described hereinbefore. The passageway portion 32' may be substantially identical to that described hereinbefore, or modified as necessary to be received within the space provided by the host vehicle 12', and will not be described at length hereinafter. For example, although shown as one piece, it is contemplated that the passageway portion 32' may be formed as two or more pieces to facilitate the installation, manufacture, and assembly process.

As shown, the inlet portion 30' is adapted to be secured to a rearward facing surface of the facia 14' so as to communicate with the opening 29 formed in the recessed portion 14a' thereof. The inlet portion 30' preferably includes mounting wings that are secured by mechanical fasteners 31 to accommodating bosses 33 formed in the rearward facing surface of the facia 14' so as to surround the opening 29 therein.

The outlet portion 34' preferably integrally includes the fins (not shown), and is adapted to be received through the opening 37 in the wheel well liner 20'. The outlet portion 34' may be affixed to the wheel well liner 20' by mechanical fasters such as screws and/or attached to the downstream end of the passageway portion by a friction fit, band clamps, a twist-and-lock type cooperative clamming connection, a bayonet-type fastener connection. Similarly, the upstream end of the passageway portion 32' may be held in the inlet portion 30' by a friction fit or by band clamps, screws, or cooperating plastic fasteners. Naturally, the passageway portion 32' may be secured to adjacent structural supports of the vehicle 12' at locations along its length, and will be tightly held in its length direction by the inlet and outlet portions 30', 34', so support thereof is not an issue.

Although the preferred embodiments of the present invention have been described with particularity herein, the present invention is not limited thereto. Rather, it is believed apparent that the present invention is capable of numerous modifications, rearrangements, and substitutions of parts, and particularly is customizable for adaptation to specific vehicle layouts and requirements, and therefore is not limited to the particular embodiments described hereinbefore. Rather, the present invention is only defined by the claims appended hereto.

What is claimed is:

1. A brake duct assembly for use in communicating cooling air from a front portion of a vehicle to a front brake assembly of the vehicle, comprising:

an inlet portion disposed in said vehicle front portion;

an outlet portion disposed laterally inwardly from the front brake assembly and the inlet portion, through which cooling air flows out of said brake duct assembly toward the front brake assembly; and, a passageway portion extending between and fluidly connecting said inlet portion to said outlet portion such that an air stream flowing through said inlet portion is communicated to said outlet portion, wherein the passageway portion extends laterally inwardly from the inlet portion to the outlet portion, such that the cooling air flows in an inward direction through the passageway portion;

wherein said outlet portion is spaced a distance from said front brake assembly and includes a plurality of fins that transforms the air stream from said passageway portion into a plurality of air streams and directs said plurality of air streams outwardly toward said front brake assembly to cool said front brake assembly, wherein said outlet portion includes an outlet face including an inward edge and a outward edge, said inward edge being disposed relatively rearwardly of said outward edge such that said outlet face is angled laterally outwardly, and wherein the outward edge of the outlet face has a relatively smaller opening area than the inward edge of the outlet face.

2. The brake duct assembly according to claim 1, wherein said outlet portion is attached to a wheel well liner and is disposed forwardly of said front brake assembly.

3. The brake duct assembly according to claim 1, wherein three fins are provided by said outlet portion.

4. The brake duct assembly according to claim 1, wherein said inlet portion is disposed at a first vertical height, and said outlet portion is disposed at a second vertical height, said first height being greater than said second height.

5. The brake duct assembly according to claim 1, wherein said inlet portion is received in a front facia of said vehicle.

6. The brake duct assembly according to claim 1, wherein said outlet portion is attached to a wheel well liner and is disposed forwardly of said front brake assembly, and wherein the outlet portion is attached to the wheel well liner with the outlet face flush with the wheel well liner.

7. The brake duct assembly according to claim 6, wherein said outlet portion is disposed relatively below said front brake assembly.

8. The brake duct assembly according to claim 7, wherein said plurality of fins extend forwardly substantially perpendicular to said outlet face, and wherein said plurality of fins are positioned so as to turn the cooling air flow entering the outlet portion.

9. The brake duct assembly according to claim 8, wherein said passageway portion defines a flattened, substantially rectangular cross sectional shape that permits sufficient air flow therethrough while reducing a vertical height of said passageway portion, and wherein said passageway portion, at a downstream end adjacent the outlet portion, has a cross sectional area that is less than the cross sectional area of the outlet face.

10. An assembly for communicating cooling air to a front brake assembly of a vehicle, comprising:

a front facia disposed at a front of the vehicle, said facia providing an opening;

a wheel well liner, said wheel well liner surrounding a wheel assembly that includes said front brake assembly and providing an opening through an inner portion of the wheel well liner, the inner portion being disposed inwardly relative to the front brake assembly; and, a brake duct assembly, comprising an inlet portion in communication with said facia opening;

an outlet portion secured to said wheel well liner and in communication with said wheel well liner opening, through which cooling air flows out of said brake duct assembly toward the front brake assembly; and, a passageway portion extending between and fluidly connecting said inlet portion to said outlet portion such that an air stream flowing through said inlet portion is communicated to said outlet portion;

wherein said outlet portion is spaced a distance from said front brake assembly and includes a plurality of fins that serve to transform the air stream from said passageway portion into a plurality of air streams, said plurality of air streams being directed toward said front brake assembly and serving to cool said front brake assembly, wherein said outlet portion includes an outlet face including an inward edge and an outward edge, said inward edge being disposed relatively rearwardly of said outward edge such that said outlet face is angled laterally outwardly, the inner portion of the wheel well liner includes an angled surface that is angled to correspond to the laterally outward angle of the outlet face, and the outlet face and the angled surface of the wheel well liner are flush with one another.

11. The assembly according to claim 10, wherein the front facia includes a recessed area surrounding the opening in the front facia, wherein the recessed area tapers into the opening.

12. The assembly according to claim 10, wherein said outlet portion is disposed forwardly of said front brake assembly.

13. The assembly according to claim 12, wherein three fins are provided by said outlet portion.

14. The assembly according to claim 13, wherein said inlet portion is disposed at a first vertical height, and said outlet portion is disposed at a second vertical height, said first height being greater than said second height.

15. The assembly according to claim 10, wherein the wheel well liner opening is disposed adjacent to a bottom end of the wheel well liner, such that said outlet portion is disposed laterally inwardly and relatively below said front brake assembly.

16. The assembly according to claim 15, wherein said fins extend forwardly substantially perpendicular to said outlet face.

17. The assembly according to claim 16, wherein said passageway portion defines a flattened, substantially rectangular cross sectional shape that permits sufficient air flow therethrough while reducing a vertical height of said passageway portion, and wherein said passageway portion, at a downstream end adjacent the outlet portion, has a cross sectional area that is less than the cross sectional area of the outlet face.

18. A brake duct assembly for use in communicating cooling ram air from a front portion of a vehicle to a front brake assembly of the vehicle, comprising:

an inlet portion disposed in said vehicle front portion, the inlet portion having an intake opening facing a front direction of the vehicle, and an output opening facing a rear direction of the vehicle, with the remainder of the inlet portion being formed of a closed body;

an outlet portion through which cooling air flows out of said brake duct assembly toward the front brake assembly, the outlet portion having an intake opening facing the front direction of the vehicle, and an outlet face for the cooling air flow to reach the front brake assembly, with the remainder of the outlet portion being formed of a closed body; and, a passageway portion extending between and fluidly connecting said inlet portion to said outlet portion, the passageway portion being formed of a closed body allowing fluid communication between the inlet portion and the outlet portion;

wherein said inlet portion, outlet portion, and passageway portion are hollow, function solely to transport ram air received from the inlet portion intake opening, are formed separately from one another and are connected together to form said brake duct assembly, said inlet portion being secured between said vehicle front portion and said passageway portion so as to communicate cooling air to said passageway portion, said outlet portion being secured to a portion of the vehicle and to said passageway portion so as to receive cooling air flowing through said passageway portion;

wherein said outlet portion is spaced a distance from said front brake assembly and includes a plurality of fins that serve to transform the air stream received from said passageway portion into a plurality of air streams, said plurality of air streams being directed toward said front brake assembly and serving to cool said front brake assembly, and wherein said inlet portion is disposed at a first vertical height, said outlet portion is disposed at a second vertical height, and said passageway portion is disposed at a third vertical height, said first height being greater than said second height, and said second height being greater than said third height.

19. The brake duct assembly according to claim 18, wherein said outlet portion is attached to a wheel well liner and is disposed forwardly of said front brake assembly.

20. The brake duct assembly according to claim 18, wherein three fins are provided by said outlet portion.

21. The brake duct assembly according to claim 18, wherein said inlet portion is received in a front facia of said vehicle.

22. The brake duct assembly according to claim 18, wherein said outlet portion includes an outlet face including an inward edge and a outward edge, said inward edge being disposed relatively rearwardly of said outward edge such that said outlet face is angled laterally outwardly.

23. The brake duct assembly according to claim 22, wherein said outlet portion is attached to a wheel well liner and is disposed forwardly of said front brake assembly.

24. The brake duct assembly according to claim 23, wherein said outlet portion is disposed laterally inwardly and relatively below said front brake assembly.

25. The brake duct assembly according to claim 24, wherein said plurality of fins extend forwardly substantially perpendicular to said outlet face.

26. The brake duct assembly according to claim 25, wherein said passageway portion defines a flattened, substantially rectangular cross sectional shape that permits sufficient air flow therethrough while reducing a vertical height of said passageway portion.

* * * * *